United States Patent
Marcath et al.

(10) Patent No.: US 11,820,504 B2
(45) Date of Patent: Nov. 21, 2023

(54) TAXI OF UNMANNED AERIAL VEHICLES DURING PACKAGE DELIVERY

(71) Applicant: Ford Global Technologies, LLC, Dearborn, MI (US)

(72) Inventors: Jason C. Marcath, Dearborn, MI (US); Daniel Paul Roberts, Livonia, MI (US); Leslie James Lindeman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1150 days.

(21) Appl. No.: 16/076,529

(22) PCT Filed: Feb. 9, 2016

(86) PCT No.: PCT/US2016/017128
§ 371 (c)(1),
(2) Date: Aug. 8, 2018

(87) PCT Pub. No.: WO2017/138922
PCT Pub. Date: Aug. 17, 2017

(65) Prior Publication Data
US 2019/0039731 A1    Feb. 7, 2019

(51) Int. Cl.
*B64C 39/02* (2023.01)
*B64F 1/10* (2006.01)
(Continued)

(52) U.S. Cl.
CPC .......... *B64C 39/024* (2013.01); *B64F 1/007* (2013.01); *B64F 1/10* (2013.01); *B60R 9/00* (2013.01);
(Continued)

(58) Field of Classification Search
CPC .......... B64C 39/024; B64F 1/007; B64F 1/10; B64F 1/222; B60R 9/00; B64U 10/10;
(Continued)

(56) References Cited

U.S. PATENT DOCUMENTS 8,276,844 B2    10/2012   Kariv
9,056,676 B1 *   6/2015   Wang ...................... B64F 1/222
(Continued)

FOREIGN PATENT DOCUMENTS

CN    102200412 B    11/2013

OTHER PUBLICATIONS

Workhorse Aerospace, "Horsefly Autonomous Drone Delivery System," https://workhorse.com/aerospace, accessed Aug. 31, 2018, 11 Pages.
(Continued)

*Primary Examiner* — Peter D Nolan
*Assistant Examiner* — Demetra R Smith-Stewart
(74) *Attorney, Agent, or Firm* — Vichit Chea; Brooks Kushman P.C.

(57) ABSTRACT

A delivery system includes a processor programmed to construct a route so as to include predefined segments traveled by carriers configured to taxi the vehicle and charge a battery thereof such that a state of charge of the battery remains above a target for a duration of the route, and forward the route to the vehicle.

18 Claims, 7 Drawing Sheets

(51) Int. Cl.
*B64F 1/00* (2006.01)
*B64U 10/10* (2023.01)
*B64U 10/13* (2023.01)
*B64U 50/19* (2023.01)
*B64U 80/86* (2023.01)
*B64U 101/60* (2023.01)
*B60R 9/00* (2006.01)
*B64F 1/22* (2006.01)

(52) U.S. Cl.
CPC .............. *B64F 1/222* (2013.01); *B64U 10/10* (2023.01); *B64U 10/13* (2023.01); *B64U 50/19* (2023.01); *B64U 80/86* (2023.01); *B64U 2101/60* (2023.01); *B64U 2201/104* (2023.01)

(58) Field of Classification Search
CPC ........ B64U 10/13; B64U 50/19; B64U 80/86; B64U 2101/60; B64U 2201/104; G06Q 10/047; G06Q 50/32
See application file for complete search history.

(56) References Cited

U.S. PATENT DOCUMENTS

| | | |
|---|---|---|
| 9,139,310 B1 | 9/2015 | Wang |
| 2012/0152654 A1 | 6/2012 | Marcus |
| 2014/0254896 A1 | 9/2014 | Zhou et al. |
| 2014/0339371 A1 | 11/2014 | Yates et al. |
| 2015/0353206 A1* | 12/2015 | Wang ................. B60R 9/00 244/114 R |
| 2015/0370251 A1* | 12/2015 | Siegel ................ B64D 1/22 701/2 |
| 2016/0196756 A1* | 7/2016 | Prakash ............. G08G 5/025 701/3 |
| 2016/0272308 A1* | 9/2016 | Gentry ............... B64C 25/001 |
| 2016/0364678 A1* | 12/2016 | Cao ................... G06Q 50/30 |
| 2016/0364823 A1* | 12/2016 | Cao ................... G06Q 50/30 |
| 2016/0376031 A1* | 12/2016 | Michalski .......... G08G 5/025 701/15 |
| 2017/0160735 A1* | 6/2017 | Mikan ................ G08G 1/20 |

OTHER PUBLICATIONS

International Search Report and Written Opinion for Application No. PCT/US2016/017128, dated Jun. 24, 2016, 4 Pages.

* cited by examiner

TAXI OF UNMANNED AERIAL VEHICLES DURING PACKAGE DELIVERY

CROSS-REFERENCE TO RELATED APPLICATION

This application is the U.S. national phase of PCT Application No. PCT/US2016/017128 filed on Feb. 9, 2016, which is incorporated herein by reference in its entirety.

TECHNICAL FIELD

The present disclosure relates to the use of unmanned aerial vehicles in package delivery systems.

BACKGROUND

Carriers provide transportation of packages or parcels between locations throughout the world. Shipment of a package may require hand delivery or pickup. Such hand delivery or pickup, however, may be inefficient or impractical depending on retrieval and delivery locations.

SUMMARY

A delivery system may include a processor programmed to construct a route to include predefined segments traveled by carriers configured to taxi a vehicle. The processor may construct the route in response to a request for a route to a destination. The processor may be programmed to charge a battery of an unmanned aerial vehicle such that a state of charge of the battery remains above a target for the duration of the route. The route may be forwarded to the vehicle.

The processor may be programmed to construct the route such that an inflight portion of a travel time therefor is minimized. The processor may be programmed to construct the route such that the travel time therefor is less than a specified travel time. The processor may be programmed to receive the predefined segments.

The unmanned aerial vehicle, as stated above, may be a drone. The route may include a pickup location and delivery location. The pickup or delivery location may be at least one of the carriers. The carriers may be military vehicles.

DETAILED DESCRIPTION

Figure 1:
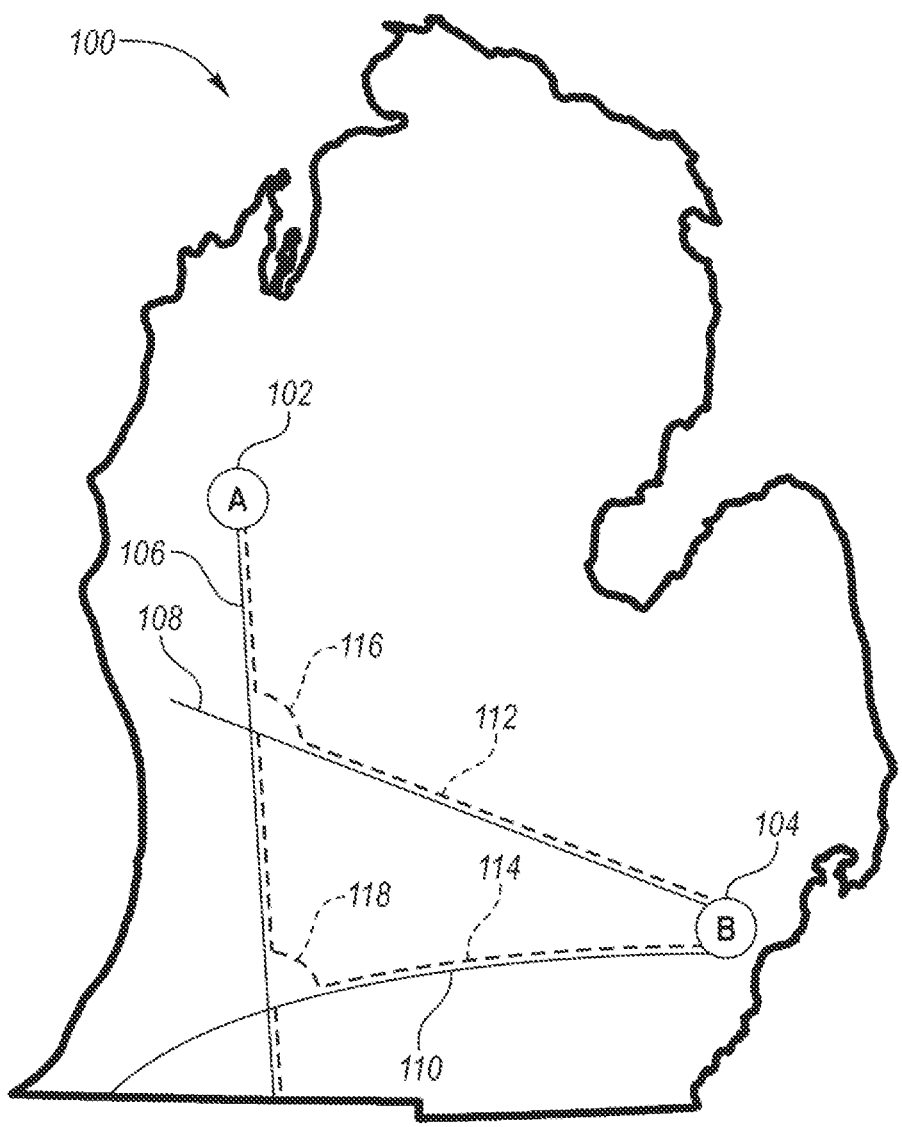
FIG. 1 is a map depicting potential routes for a UAV to taxi on carriers.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Carriers are used to deliver packages throughout the world. Common carriers may include UPS, FedEx, or government affiliated organizations. Transport vehicles of common carriers may be organized with routes that include segments to deliver packages on the route. Packages may be transported through a web of segments. These routes may be analyzed to find the best possible route or group of routes to deliver a package. The routes may be current or anticipated. These routes may include poor delivery metrics due to drop-off and pickup exchanges that hinder the timely delivery of packages because transport vehicles or carriers are required to stop and wait for loading and unloading.

Contract carriers may include for-hire parcel services. A for-hire service may deliver packages to a specific location based on an immediate need. For example, a transplant organ may need to be transported between hospitals from the donor to recipient. For-hire services may be cost inefficient due to the limited economy of scale related to delivering one package at a time. These private carriers may also include military vehicles. A supply truck or forward vehicle may transport supplies to forward positions in order to provide food, ammunition, or inessential items.

Another type of carrier may include common vehicles self-availed to deliver packages. For example, these carriers may be notified or sign up to be notified of immediate delivery needs. As "for-hire carrier organizational system" for packages, these carriers may be identified by historically determined routes or proximity to retrieval and delivery locations. For instance, a person who travels to a work location every weekday morning may be identified as a candidate to carry packages between locations. Each of the carriers and routes may have segments or portions that comprise the route.

UAVs may be coupled to carriers to deliver packages. A UAV may attach to a carrier to deliver packages without requiring driver assistance to place a package in a delivery area. A delivery service may have a license to place a docking station on a carrier, allowing UAVs to come and go as necessary. A driver on a delivery route may also direct a UAV to deliver a package from the delivery vehicle or carrier. A UAV may also include or be connected to a processor programmed to identify delivery locations based on navigational data, such as GPS, to autonomously deliver the package. For instance, a drone may be configured to recognize packages on the delivery vehicle or carrier. The UAV may recognize the location of the vehicle being proximate to the delivery location. The UAV may retrieve the package from the carrier's storage and deliver the package. This package delivery system may be analyzed by a computer or server system in communication with the drone or delivery vehicle. The server may analyze and preplan packages prepared and ready for delivery on a given day by recognizing the delivery date and location of the package. The server may organize packages on the delivery vehicle. The server may determine an optimal delivery route for the carrier by analyzing transit times between each of the package delivery locations to minimize route length or time to complete the route.

Each carrier may be fitted with a charging and docking station configured to charge at least one UAV. The docking station may be configured to taxi the UAV on the carrier until the UAV decides to eject. The docking system may have articulating hooks or actuated locks to hold the UAV in place during taxi. The charging system may be configured to directly or wirelessly charge the UAV. The charging system may be configured to recharge a UAV employing other propulsion methods. For instance, the charging station could be configured to recharge or refill a UAV operating on gas, diesel, or hydrogen.

The UAV or drone may be autonomous or remotely directed. A server, processor, or controller may provide aerial navigation commands to a drone to establish flight paths and delivery methods. The drone may be configured to create its own path based on waypoints dictated by a central server. The drone may be configured to create its own path based on a retrieval and delivery location sent from a server. The UAV may also be controlled remotely by someone at a central control center or a person within the carrier. The carrier may be fitted to include a control mechanism and communication systems to control multiple UAVs.

A server, processor, or controller in communication with the UAV or on the UAV itself may be configured to construct, orchestrate, compose, fabricate, engineer, create, design, erect, establish, fashion, forge, form, formulate, manufacture, produce, set up, or shape a delivery route based on multiple carriers to retrieve and deliver a package. The route construction may include a compilation of all routes near and between the retrieval and delivery locations. Near and between may mean a 50-mile wide strip between the retrieval and delivery locations and a 50-mile radius surrounding the retrieval and delivery locations. For instance, a package delivery may be requested between a warehouse in City A, and a house in City B. City B may be Southeast from the warehouse. A processor may identify all routes between and surrounding the cities. A processor may designate those routes as useful by analyzing all of the routes leaving or projected to leave City A having a direction within 45° of a direct heading to City B. If City B is Southeast (45°) of the warehouse, the processor would identify all routes having segments within a radius of City A having an azimuthal direction of travel between 90° and 180° the direction of travel from the retrieval location. If no routes are found within the strip, the size of the strip may be increased to obtain more routes. If too many routes are found, the strip may be decreased to better routes. The processor may analyze each route's endpoints to determine the segment length. For instance, should the route end outside of the strip, the processor may limit the segment to stay within the bounds of the strip. The processor may continue to build or construct the route using this method, by adding additional segments, until the route is near enough the delivery location for the UAV to deliver the package. The route may also ensure that the UAV has enough energy to return to a carrier after delivery for storage or charging. The UAVs may reside at a warehouse or on carriers until the next delivery request is received.

Routes may include a present heading, route data derived from a navigation system, anticipated route data based on a driving record, or other routes derived by the process. The processor may also be configured to recognize when the route, as anticipated, has deviated from a general direction of travel a specified angle from the delivery location. When the processor has determined that the angle of the carrier's route has deviated from the delivery location, the processor may perform another search for routes having segments within a radius of the segment endpoint and heading in a direction to the delivery location.

The UAV may not reside on the carrier for the entire of the trip, and multiple UAVs may be used to perform the package delivery. One UAV may be used for the first portion of the trip, and another UAV may be used for a second portion of the trip. The processor may be configured to determine the best use of the UAVs to ensure limited down time. For instance, if a UAV is on a route requiring the UAV to taxi on a carrier for an extended period of time, e.g., greater than five hours, the processor may determine that two UAVs should be used. The first UAV would be used to deliver the package on the carrier or for the first portion of the route. The second UAV would be used to deliver the package to the residence or for the second portion of the route.

The route may be constructed based on an estimated state of charge ("SOC") of the UAV. For example, a threshold level for a UAV may be set at 25% SOC. The route may be constructed to ensure that the threshold level is not exceeded, meaning the SOC remains above 25%. A route may be constructed to maximize the usage of carrier taxiing in relation to the inflight time. For instance, if two routes can provide delivery of a package, the server or processor may be configured to select the route with the least flight time for the UAV. The server or processor may have a maximum threshold for overall package delivery time in relation to the inflight time. For instance, if one of the routes having lower inflight time has a delivery time twice as long as the longer inflight route, the processor may choose the longer inflight time having a shorter trip duration. The processor may also determine that UAV is not the best method for delivery due to a travel time longer than a specified travel time. The system may alert operations that the package does not have a delivery time meeting the specified travel time threshold.

Route construction may take into account the timing of each route to prevent delays. A UAV may have an intended route that uses Carrier A and Carrier B. The route of Carrier A and Carrier B intersect or are near enough to allow a UAV to move the package between the two carriers at a Point A. Unfortunately, both carriers do not arrive near Point A at the same time. Carrier A leaves at 10:00 AM and expects to arrive at Point A by 10:30 AM. Carrier B leaves at 1:00 PM and expects to arrive at Point A by 1:15 PM. The route construction system is able to notice these timing issues and delays. The system may choose a different route if the delays are too substantial (e.g., five hours). The processor may construct the route with a delay where the UAV maintains a constant hovering pattern, resting pattern on the ground, or transports the package closer to the pickup point. The processor may be able to take into account other timing based factors (e.g., weather, traffic, etc.). The processor may derive a statistical analysis to determine the likelihood of intersection between routes and the probability of delay. Using these factors, the processor may select a preferred route based on the delays, overall length, inflight time, etc. The processor may choose to reduce delays and flight time at the expense of overall length. The processor may choose to reduce delays at the expense of flight time. UAVs may be further configured to prevent collisions with other UAVs. For example, if a carrier is fitted with a docking station capable of carrying multiple UAVs, the UAVs may be configured with proximity or awareness sensors to reduce collisions.

Referring now to FIG. 1, a route 100 is constructed for delivery of a package. For visualization purposes this route is shown on a map. As is known in the art, the route may be constructed as a sequence of locations or data points and times. Point A 102 is a retrieval location. Point B 104 is a delivery location. A plurality of routes 106, 108, 110 driven by carriers are shown. The carriers may have already begun traveling on routes 106, 108, 110 or anticipate traveling on the routes 106, 108, 110. The routes 106, 108, 110 may include intended or anticipated travel times at waypoints along the route. For instance, the carrier on route 106 may intend to arrive at the intersection between 106 and 108 at 10:30 AM. The carrier on route 108 may intend to arrive at the intersection between 106 and 108 at 1:30 PM. In this fashion, a processor may construct a route to allow a UAV to deliver a package from Point A 102 to Point B 104. The route for the UAV may include disembarking the carrier on route 106 at flight 116 and traveling with the carrier on route 108 on route 112. The processor may choose this route instead of the route using segments of route 106 and route 110 because of similar inflight times at flights 116, 118 and shorter overall travel route for the combination of segments from route 106 and segments from route 108. The processor may construct the route for the UAV including segments of route 106, 110 if the delay time at the intersection of route 106 and route 108 is too long (e.g., five hours).

Figure 2:
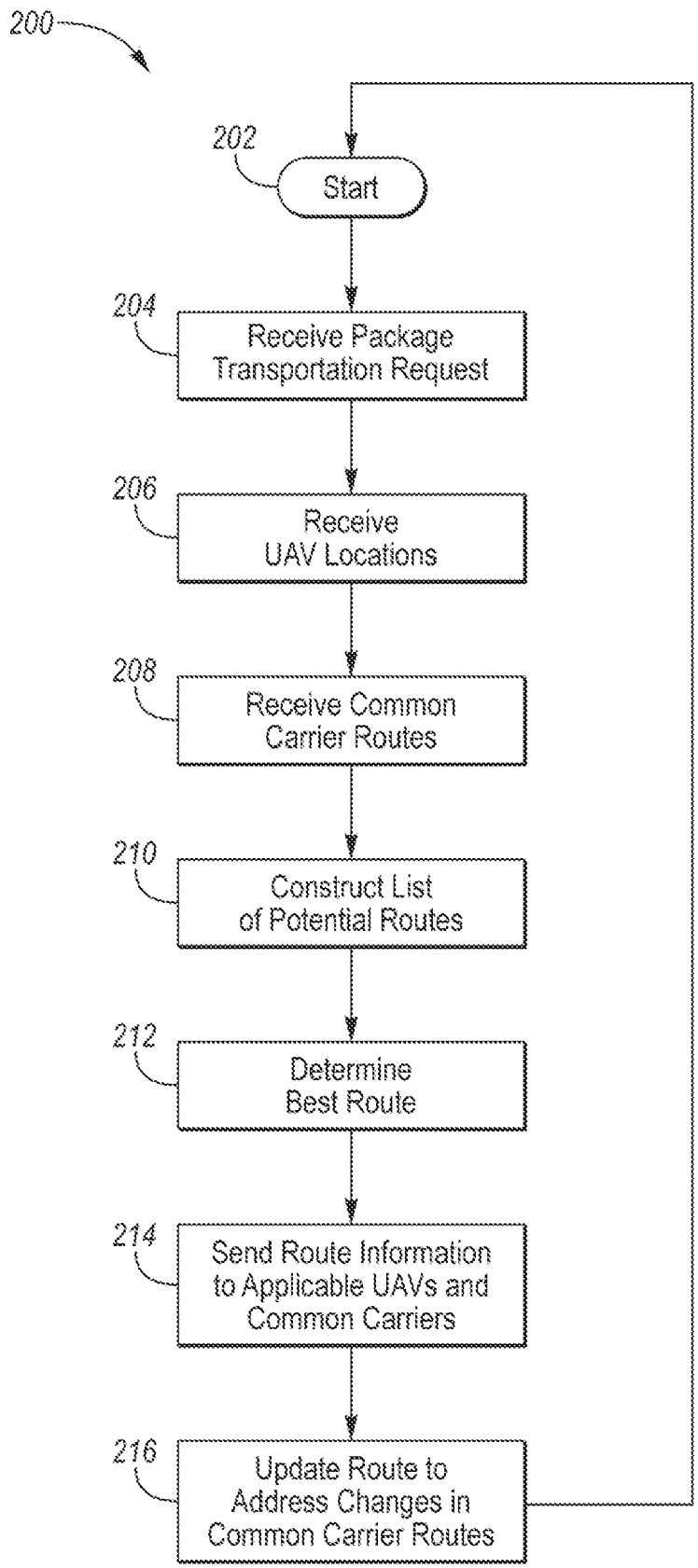
FIG. 2 is a flow chart of an algorithm for constructing a list of potential routes.
Figure 3A:
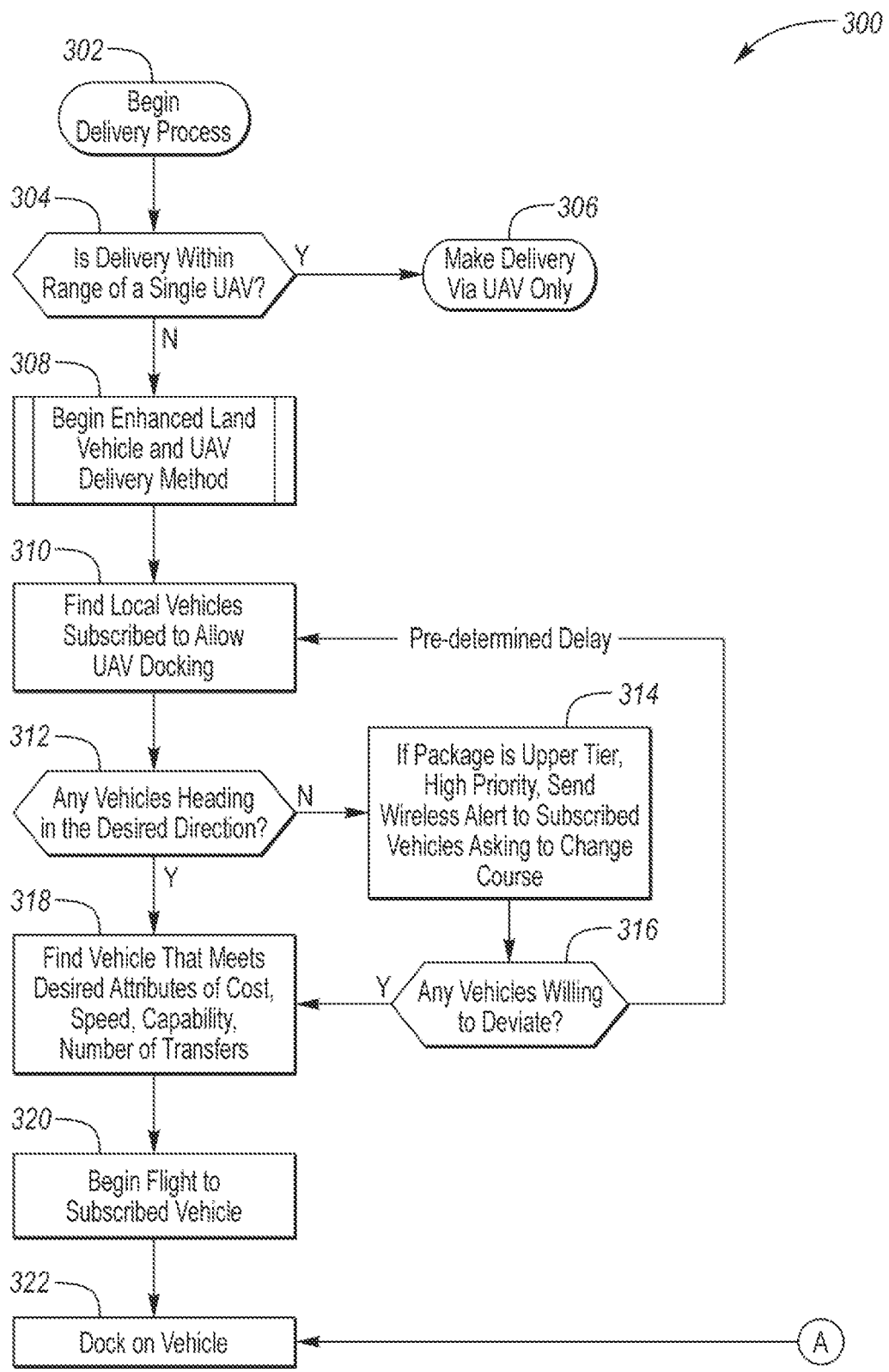
FIGS. 3A-3D are flow charts of an algorithm for delivering a package using a UAV.
Figure 3B:
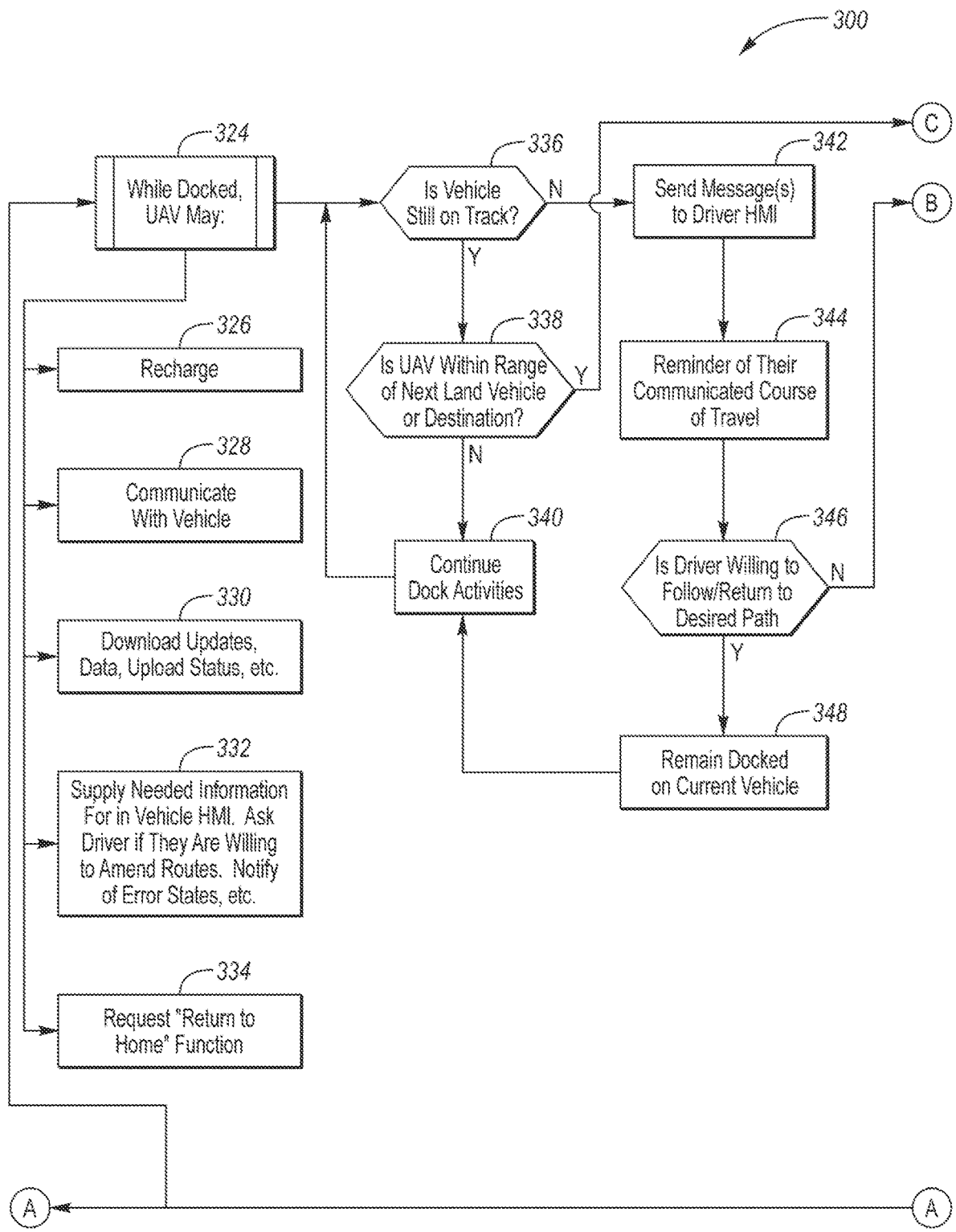
Figure 3C:
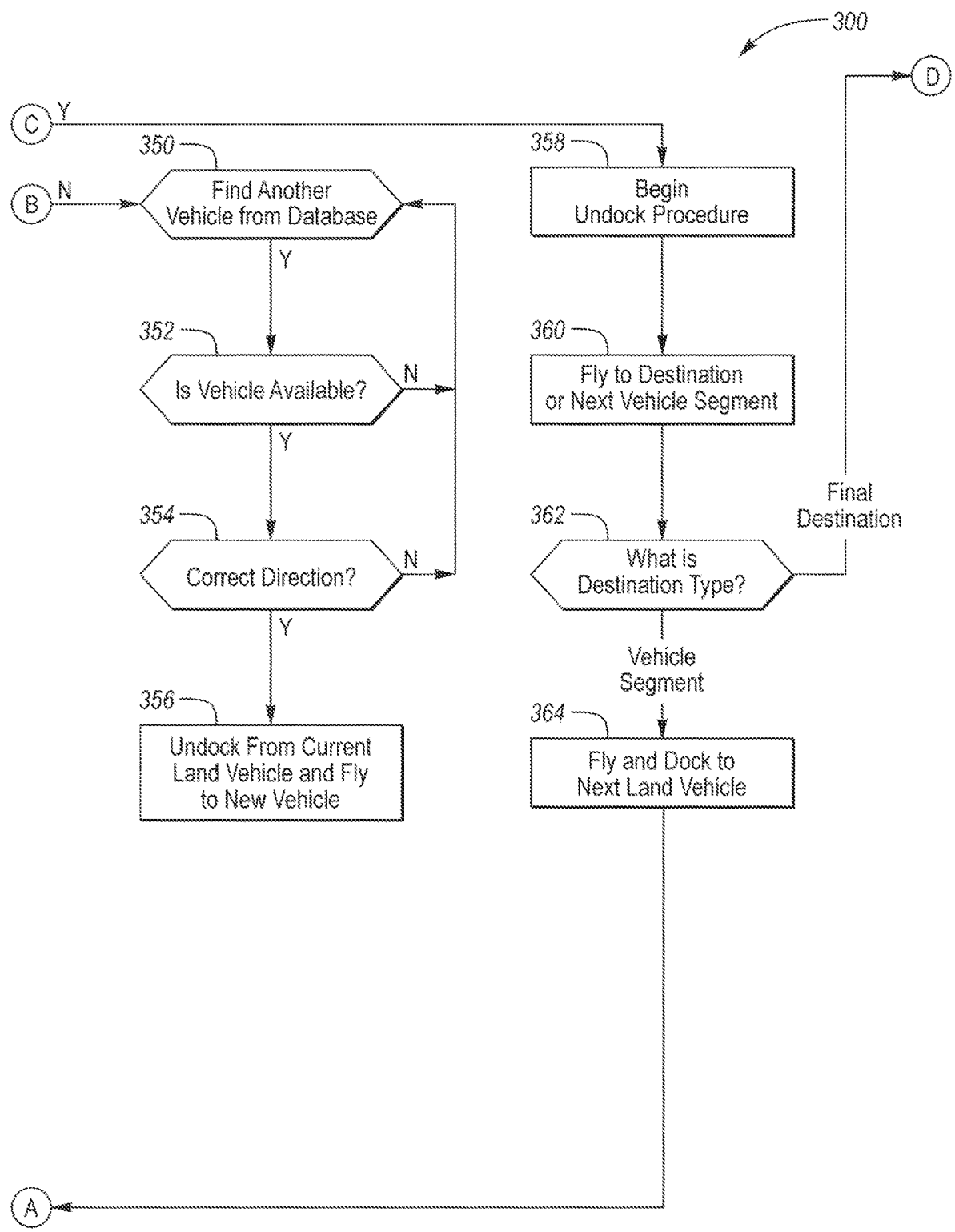
Figure 3D:
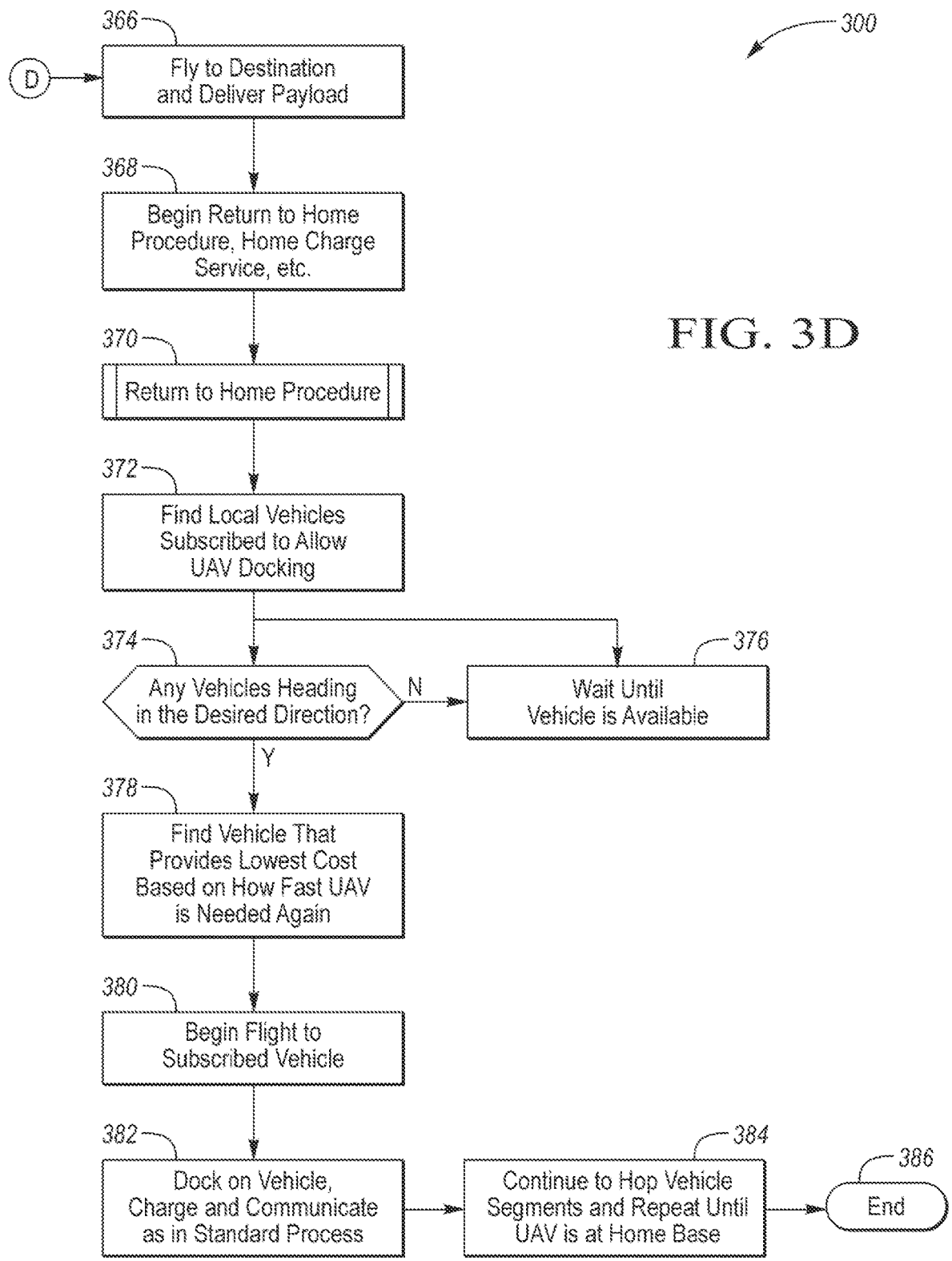

Referring now to FIG. 2, an algorithm 200 for determining a route is depicted. The algorithm 200 starts at step 202. At step 204 a package transportation request is received by the server, processor, controller, carrier, or UAV. At 206, the server, processor, or controller determines locations of UAVs and carriers. Locations may be anticipated or current. At step 208, carrier routes, as anticipated or known, are received. At step 210, a list or relational database of potential routes is constructed including segments of the available routes anticipated or known by the carriers. The list may include expected delay times, intersection times, inflight times, and route duration. At step 212, a preferred route may be determined. At step 214, the route may be sent to applicable UAVs and carriers. At step 216, the route may be updated depending on deviations by the carriers to particular routes, mechanical issues with the carriers or UAVs, and another iteration of the algorithm 200 may be performed if the route is updated.

Referring now to FIGS. 3A-3D, an expanded algorithm 300 for delivering a package is depicted. In step 304, a processor may determine whether a single UAV can deliver the package from the retrieval site. In step 306, the single UAV delivers the package. In step 308, an enhanced package delivery method is started. In step 310, a broadcast may be established to locate local vehicles subscribed as carriers. In step 312, vehicles heading in the desired direction may be identified. In step 314, higher priority packages requiring delivery may demand that a carrier changes course to meet the delivery demands. In step 316, vehicles willing to deviate may be selected to meet delivery demands. In step 318 vehicles that meet desired attributes may be used to transfer the package. In step 320, flight to the subscribed carrier may be started. In step 322, the UAV may dock on the carrier to begin taxiing. In step 324, the UAV may recharge in step 326; communicate with the carrier in step 328; download updates in step 330; supply needed information in step 332 to the vehicle human machine interface to notify drivers or passengers of attachment and to maintain route; and request a return to a storage location in step 334. In step 336, if the carrier is still on track the UAV may maintain position 340 on the dock or perform a transfer, in step 338 to a different vehicle. In step 342, if the carrier is not on course, as determined in step 336, the UAV or server may send a message to the carrier to return to the route. In step 344, the UAV or server may remind the carrier of the intended route. In step 346 the driver may provide indication as to whether the constructed route will be followed. In step 348, the vehicle may remain docked unless, as determined in step 346, the driver chooses not to follow the route. In step 350, if the driver of the vehicle will not return to desired path, as determined in step 346, another carrier may be located for taxiing. In step 352 and step 354, a loop continues until a carrier is available in the correct direction. In step 356, the UAV may undock from the current carrier, and switches to the new carrier.

If the UAV is within the next carrier or destination, as determined in step 338, the UAV may begin the undock procedure in step 358. In step 360 the UAV may proceed to the next carrier or segment. In step 362, if the destination type is another carrier, the process repeats as shown in step 364. If it is determined in step 362 that the destination is a delivery, the UAV, in step 366, may fly to the destination and deliver the payload. In step 368, the UAV begins the return to home procedure. Header 370 starts the return home procedure. In step 372, local subscribed carriers may be found to allow docking of the UAV. In step 374, the processor or server may determine whether any carriers are headed in the proper direction. The UAV may wait until a carrier is available for taxiing in step 376. In step 378 the UAV may find a carrier that has the lowest taxiing charge for transport. In step 380 the UAV beings flight to subscribed carrier. In step 382 the UAV docks on the carrier and charges itself. In step 384 the UAV may continue to hop until it has reached a storage location or home base. The process ends in step 386.

Figure 4:
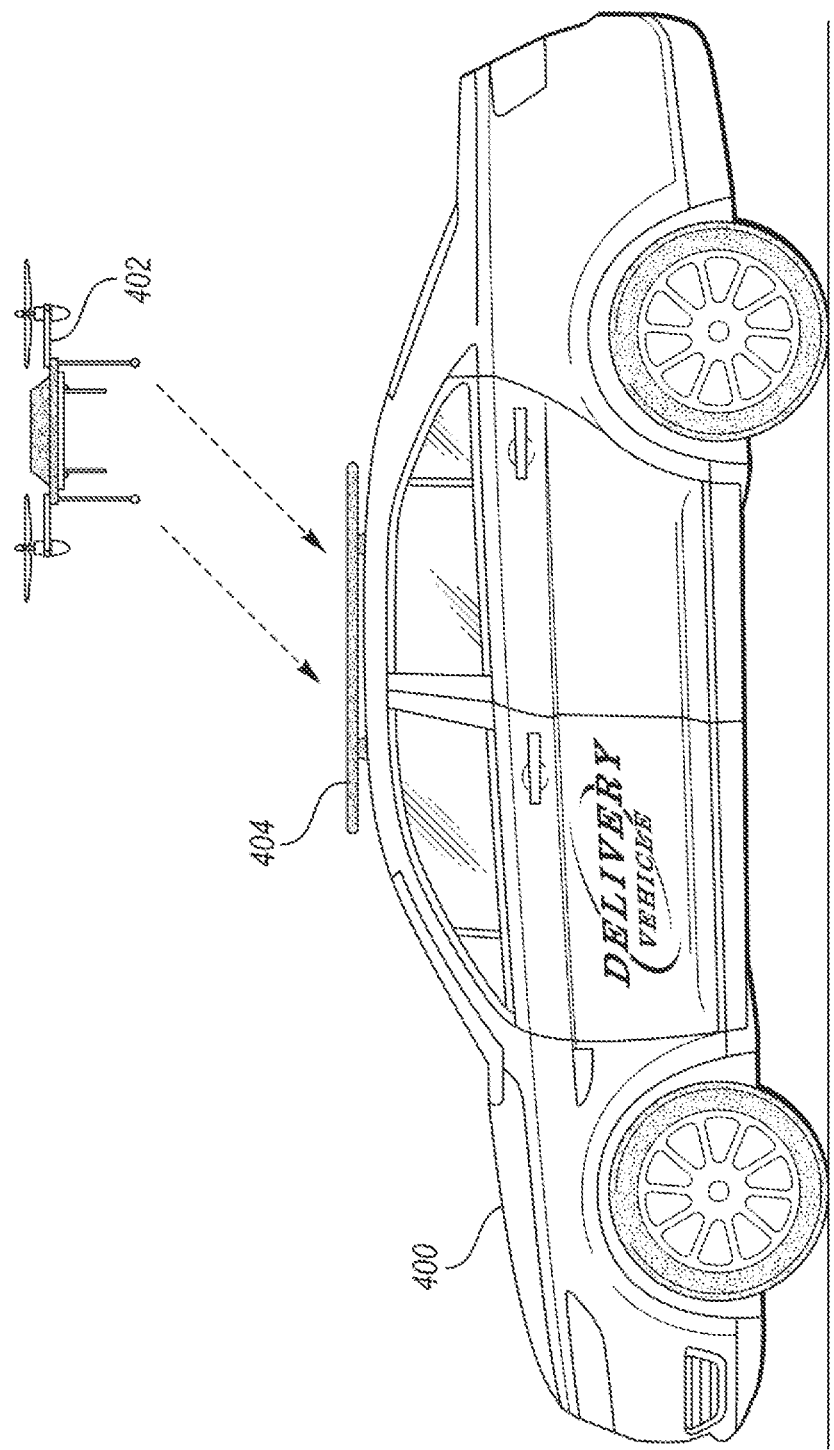
FIG. 4 is a depiction of a interaction between a UAV and a carrier.

Now referring to FIG. 4, a UAV taxiing system is shown. The carrier 400, includes a docking station 404 for UAV 402. The carrier 400 may be a common vehicle, common carrier, contract carrier, or other type of vehicle. The docking station 404 may be located on the roof of the carrier. The docking station 404 may also be on a separate trailer of the carrier 400. The docking station 404 may include wired or wireless electrical connections to the carrier 400 to allow recharging of UAV 402 batteries. The docking process of the UAV may be optimized such that the UAV 402 can dock and undock with the carrier 400 while the carrier 400 is in motion. The UAV 402 may begin communicating with the carrier 400 upon approach to determine direction and speed. As is known in the art, V2X communications may be used to facilitate a docking process. The UAV 402 may use this procedure to determine vehicle speed, direction, and intended route. The UAV 402 may notify the carrier 400 via a human machine interface or mobile device once the docking process has completed. The carrier 400, UAV 402, or docking station 404 may be configured to communicate off-board with a server (not shown). The server may be configured to retain delivery information as a database or other repository.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A delivery system comprising:
a processor programmed to, in response to a request from an unmanned aerial vehicle for a route to a destination, construct the route so as to include segments selected from a set of predefined segments traveled by a plurality of carriers each configured to taxi the vehicle and charge a battery thereof such that one of the carriers taxis the vehicle on one of the segments, another of the carriers taxis the vehicle on another of the segments, the vehicle transports itself from the one of the carriers to the another of the carriers, and a state of charge of the battery remains above a target for a duration of the route, and to forward the route to the vehicle.

2. The system of claim 1, wherein the processor is further programmed to construct the route such that an inflight portion of a travel time therefor is minimized.

3. The system of claim 2, wherein the processor is further programmed to construct the route such that the travel time therefor is less than a specified travel time.

4. The system of claim 1, wherein the unmanned aerial vehicle is a drone.

5. The system of claim 1, wherein the route defines pickup and delivery locations.

6. The system of claim 5, wherein the pickup location or delivery location is at one of the carriers.

7. The system of the claim 1, wherein the carriers are military vehicles.

8. A system comprising:
a processor programmed to, in response to receiving a route including segments selected from a set of predefined segments traveled by carriers configured to taxi unmanned aerial vehicles (UAV) and charge batteries thereof, execute commands to direct the UAV along the route such that portions thereof are traversed while docked and charging at different ones of the carriers to maintain a state of charge associated with the UAV above a target for a duration of the route.

9. The system of claim 8, wherein the processor is further programmed to construct the route such that an inflight portion of a travel time therefor is minimized.

10. The system of claim 9, wherein the processor is further programmed to construct the route such that the travel time therefor is less than a specified travel time.

11. The system of claim 8, wherein the route defines pickup and delivery locations.

12. The system of claim 11, wherein the pickup location or delivery location is at one of the carriers.

13. A method comprising:
by a processor,
in response to a request for a route to a destination for an unmanned aerial vehicle, constructing the route so as to include segments selected from a set of predefined segments traveled by a plurality of carriers each configured to taxi unmanned aerial vehicles such that one of the carriers taxis the unmanned aerial vehicle on one of the segments, another of the carriers taxis the unmanned aerial vehicle on another of the segments, the unmanned aerial vehicle transports itself from the one of the carriers to the another of the carriers, and an inflight travel time associated with the route is less than a target value; and
forwarding the route to an unmanned aerial vehicle.

14. The method of claim 13, wherein the carriers are further configured to charge batteries associated with the unmanned aerial vehicles and wherein the route is constructed so as to include the predefined segments such that a state of charge associated with the unmanned aerial vehicle remains greater than a threshold while traversing the route.

15. The method of claim 13, wherein the route is constructed such that a travel time associated therewith is less than a specified travel time.

16. The method of claim 15, wherein the inflight travel time is defined as a portion of the travel time.

17. The method of claim 13, wherein the route defines pickup and delivery locations.

18. The method of claim 17, wherein the pickup location or delivery location is at one of the carriers.

* * * * *